United States Patent [19]

Browning, Jr. et al.

[11] Patent Number: 4,708,180

[45] Date of Patent: Nov. 24, 1987

[54] LARGE DIAMETER NOSE BAR ROLL APPARATUS FOR VENEER LATHE WITH AUTOMATIC KNIFE GAP ADJUSTMENT DURING PEELING

[75] Inventors: Robert A. Browning, Jr., Portland; Gary W. Ely, Canby; Leonard L. Hayes, Tigard, all of Oreg.

[73] Assignee: The Coe Manufacturing Company, Painesville, Ohio

[21] Appl. No.: 867,462

[22] Filed: May 23, 1986

Related U.S. Application Data

[63] Continuation-in-part of Ser. No. 638,309, Aug. 7, 1984, Pat. No. 4,602,663.

[51] Int. Cl.⁴ .............................................. B27L 5/02
[52] U.S. Cl. ................................ 144/213; 144/357; 144/365; 364/474
[58] Field of Search ................ 364/474; 144/209 R, 144/178, 213, 356, 357, 365

[56] References Cited

U.S. PATENT DOCUMENTS

2,659,401  11/1953  Latimer .
3,207,194  9/1965   Hedberg et al. .
3,473,585  10/1969  Cremona .
3,584,666  6/1971   Jensen .
3,680,613  8/1972   Daniels et al. .
3,898,555  8/1975   Tellerman .
4,263,948  4/1981   Hasegawa .
4,396,049  8/1983   Calvert et al. ................ 144/209 R
4,557,304  12/1985  Shrum .............................. 144/357

Primary Examiner—W. D. Bray
Attorney, Agent, or Firm—Klarquist, Sparkman, Campbell, Leigh & Whinston

[57] ABSTRACT

A large diameter nose bar roll apparatus for a veneer lathe is disclosed including an automatic knife gap adjustment means. The knife gap adjustment means reduces the knife gap between the nose bar roll and the knife blade during peeling in response to decreases in the log diameter and/or changes in the knife pitch angle. This knife gap adjustment maintains the nose bar roll in contact with the log at the proper contact pressure as the diameter of the log decreases during peeling. This is necessary for nose bar rolls having a large diameter of at least 1.5 inches and 15 times the thickness of the veneer such as, for example, a nose bar roll of 3.75 inches diameter. An electrical control means is employed for automatically controlling the knife gap adjustment means by moving the nose bar roll toward the knife in response to decreases in the log diameter and changes in the pitch angle. The nose bar roll may be driven by power means to apply an auxiliary driving force for rotating the log in addition to the powered spindles provided at the opposite ends thereof for rotating such log during peeling.

20 Claims, 10 Drawing Figures

LARGE DIAMETER NOSE BAR ROLL APPARATUS FOR VENEER LATHE WITH AUTOMATIC KNIFE GAP ADJUSTMENT DURING PEELING

REFERENCE TO RELATED APPLICATION

The present application is a continuation-in-part of U.S. patent application Ser. No. 638,309 filed Aug. 7, 1984 now U.S. Pat. No. 4,602,663, issued July 29, 1986, by Robert A. Browning, Jr. and Leonard L. Hayes, also assigned to the assignee of the present application.

BACKGROUND OF INVENTION

The present invention relates generally to nose bar roll apparatus for veneer lathes, and in particular to such nose bar roll apparatus of large diameter which includes a knife gap adjustment means for automatically adjusting the knife gap between the nose bar roll and the knife blade during peeling in response to the reduction in log diameter and/or changes in the knife pitch angle.

Previously it has been proposed in U.S. Pat. No. 3,584,666 of Jensen issued June 15, 1971 to employ a nose bar roller which is powered by a motor and contacts the log ahead of the knife blade in a veneer lathe. The nose bar roller is moved into and out of contact with the log by a reciprocating carriage when an overload current is sensed in such motor due to an obstruction between the nose bar roller and the log, and to allow initial round-up of the log before peeling begins by cutting the log when the nose bar roller spaced away from such log. In addition, it has been proposed in U.S. Pat. No. 2,659,401 of Latimer issued Nov. 17, 1953 to adjust the pressure of the nose bar roller on the log to change the thickness of the veneer by employing wedges mounted on a motor driven screw shaft. In this regard, also see U.S. Pat. No. 3,680,613 of Daniels, et al issued Aug. 1, 1972 which also shows a motor driven screw shaft and cylinders for adjusting the pressure of the nose bar roll by manually operated control switches. However, in none of these patents is the gap between the nose bar roll and the knife blade adjusted automatically during peeling in response to reductions in the diameter of the log in the manner of the present invention.

Previously it has also been proposed in U.S. Pat. No. 3,473,585 of Cremona issued Oct. 21, 1969 and U.S. Pat. No. 4,263,948 of Hasegawa granted Apr. 28, 1981 to provide a veneer lathe with a knife gap adjustment means which employs a mechanical cam to adjust the gap between the pressure bar and the knife blade. This is accomplished in the Cremona patent by a double-acting piston which moves the cam wedges over cam follower rollers in order to adjust the pressure bar carriage attached to such wedges between a round-up position and a selected one of a plurality of different peel thickness positions corresponding to stops which are selected for changing the thickness of the wood veneer. Hasegawa shows a somewhat similar technique for changing the knife gap but employs an eccentric cam which is rotated by either a rack and pinion gear arrangement or a lever in order to adjust the pressure bar roll or a plurality of spaced drive roll discs which extend through slots between the pressure bar. The drive roll discs are adjusted in order to cause the spikes of the drive roll to extend further into the log as the diameter of the log decreases in order to compensate for fewer spikes being engaged with the log. This mechanical adjustment of the knife gap by use of the cams is not satisfactory because such gap adjustment cannot be readily changed to compensate for different types of wood or to take into account varying pitch angles of the knife blade. These problems are overcome in the present invention by employing an electronic control for the gap adjustment means for automatically adjusting the gap in response to decreases in the log diameter and changes in the knife pitch angle during peeling.

It has been previously proposed in U.S. Pat. No. 3,207,194 of Hedberg, et al granted Sept. 21, 1965 to mount a nose bar roll on needle bearings and to drive the nose bar roll by a motor coupled to one end thereof by a chain belt. There is no knife gap adjustment during peeling in response to decreases in the diameter of the log. Apparently, the nose bar roll of Hedberg is of a conventional type having small diameter of about $\frac{5}{8}$ inch and is not of a large diameter of at least 1.5 inch and 15 times the veneer thickness in the manner of the nose bar roll used in the present invention which is typically about 3.75 inch in diameter. As a result, such conventional nose bar roll does not tend to lose contact with the log as the diameter of the log decreases during peeling as is true of the large diameter nose bar roller of the present invention. Thus, there is no reason to adjust the gap between a conventional small diameter nose bar roller and the knife during peeling in response to the reduction in diameter of the log to maintain contact with the log and to maintain the proper pressure on the log for the production of high quality veneer of a substantially constant thickness, in the manner of the present invention.

The veneer lathe apparatus of the present invention provides automatic knife gap adjustment to reduce the gap between a large diameter nose bar roll and the lathe knife during peeling in response to a reduction in log diameter and to changes in the knife pitch angle which results in several advantages. As a result of such knife gap adjustment, a large diameter nose bar roll is maintained in contact with the log at the proper pressure during peeling, to provide a better quality veneer whose thickness stays substantially constant. In addition, this automatic knife gap adjustment is provided by means of an electronic control in the present invention which is more versatile than mechanical controls using cams since it can compensate for different types of wood and different wood conditions quickly and easily for more efficient production. Further, the invention eliminates the need for excessive pressure force to be applied to the log by the nose bar roll initially for large diameter logs to compensate for the decrease in such force as the log decreases in diameter during peeling. Such excessive initial pressure force tends to damage the veneer. In addition, the automatic gap adjustment apparatus of the present invention prevents spin-outs of the log from the drive spindles engaging the opposite ends of such log since the nose bar roll applies a more uniform pressure to the log during peeling. Also the large diameter nose bar roll prevents jamming and reduces dulling of the knife to increase the useful cutting time of the knife between sharpenings. Such nose bar roll is powered to provide auxiliary drive for rotation of the log, thereby reducing the drive which must be supplied by the spindles to further prevent spin-out. This also enables the log to be peeled to a smaller minimum core diameter.

SUMMARY OF THE INVENTION

It is therefore one object of the present invention to provide an improved veneer lathe apparatus with automatic adjustment of the gap between the nose bar roll and the knife during peeling in response to a reduction in log diameter and/or changes in the knife pitch angle.

Another object of the invention is to provide such an improved veneer lathe apparatus in which the adjustment of the knife gap is controlled by electrical control means for more versatile operation in response to changes in the type of wood or in the wood conditions of the log being peeled.

A further object of the invention is to provide such an improved veneer lathe apparatus for use with a large diameter nose bar roll in order to maintain such roll in contact with the log and to apply the proper pressure to the log during peeling in order to produce high quality veneer of substantially uniform thickness.

An additional object of the invention is to provide such a veneer lathe apparatus in which the nose bar roll is adjusted in a simple and accurate manner to reduce the knife gap during peeling and is also moved between a log contact position and a retracted position spaced from the log to enable round-up of the log before peeling.

Still another object of the invention is to provide such a veneer lathe apparatus in which the nose bar roll is of a large diameter of at least 1.5 inch and/or 15 times the thickness of the veneer to prevent jamming and to reduce dulling of the knife for more efficient operation while at the same time improving the quality of the veneer.

A still further object of the invention is to provide an improved veneer lathe apparatus in which the pressure force applied to the log by the nose bar roll is maintained at the proper value during peeling which is not excessive in order to avoid damage to the veneer.

A still additional object of the invention is to provide such a veneer lathe apparatus in which the nose bar roll is driven and applies an auxiliary driving force to the log in addition to that supplied by drive spindles at the opposite ends of the log and in which the pressure force applied to the log by such nose bar roll is maintained substantially uniform during peeling in order to prevent spin-out of the log from such spindles.

DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figure 7A:
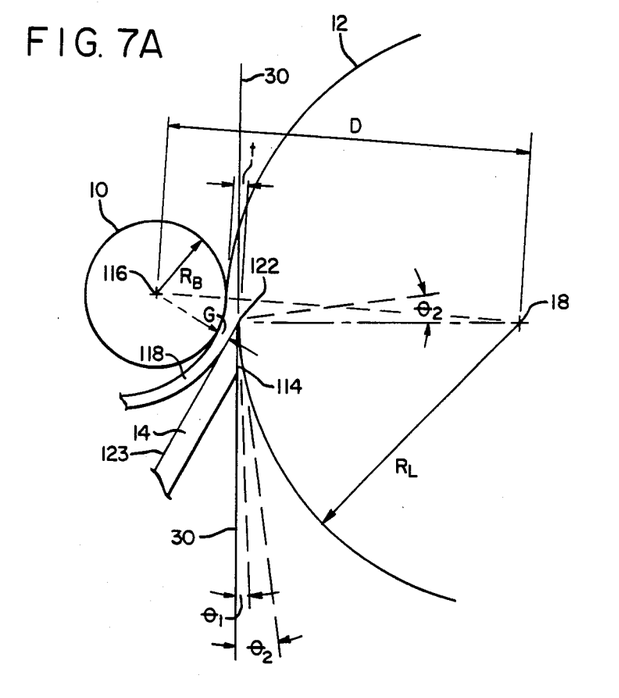
FIGS. 7A and 7B are diagrams showing, respectively, the adjustment of the knife pitch angle and the adjustment of the knife gap in response to reduction in the log diameter during peeling.

As shown in FIGS. 1 to 4 the veneer lathe apparatus of the present invention includes a nose bar roll 10 which engages the side of a log 12 at a position ahead of a lathe knife 14 as the log is rotated during peeling. The log 12 is driven by two powered spindles 16 in engagement with the opposite ends of the log to rotate such log about an axis of rotation 18. The nose bar roll 10 is of a large diameter at least 1.5 inches or 15 times the minimum thickness of the wood veneer peeled from the log and may be of the type shown in pending U.S. patent application Ser. No. 638,309 referred to above. The knife blade 14 is mounted on a main carriage 20 which moves the knife blade inward toward the axis of rotation 18 of the log 12 during peeling as the diameter of such log decreases. The knife is attached to a knife subcarriage 21 which is pivotally mounted on the main carriage 20 for adjustment of the knife angle by pivoting such knife subcarriage in a manner hereafter described. Movement of the main carriage 20 toward the log is accomplished in a conventional manner such as by a carriage motor 25 rotating a pair of screw shafts 27 connected to the opposite ends of the carriage. A cam follower roller 22 is mounted on the knife subcarriage 21 and is positioned in engagement with a cam track 24 called the "knife pitch rail" fixed to the frame. When the main carriage 20 moves horizontally to transport the knife blade 14 towards the axis of rotation 18 of the log during peeling in the direction of arrow 26, the knife carriage 21 moves therewith and is also pivoted slightly in the direction of arrow 28 by the cam follower 22 moving along the sloping cam surface of the cam track or pitch rail 24. As a result of this rotation 28 of the knife carriage 21, the pitch angle of the knife blade 14 is adjusted relative to a vertical plane 30 passing through the tip of such knife blade as shown in FIG. 7A, in a manner hereafter described.

Figure 1:
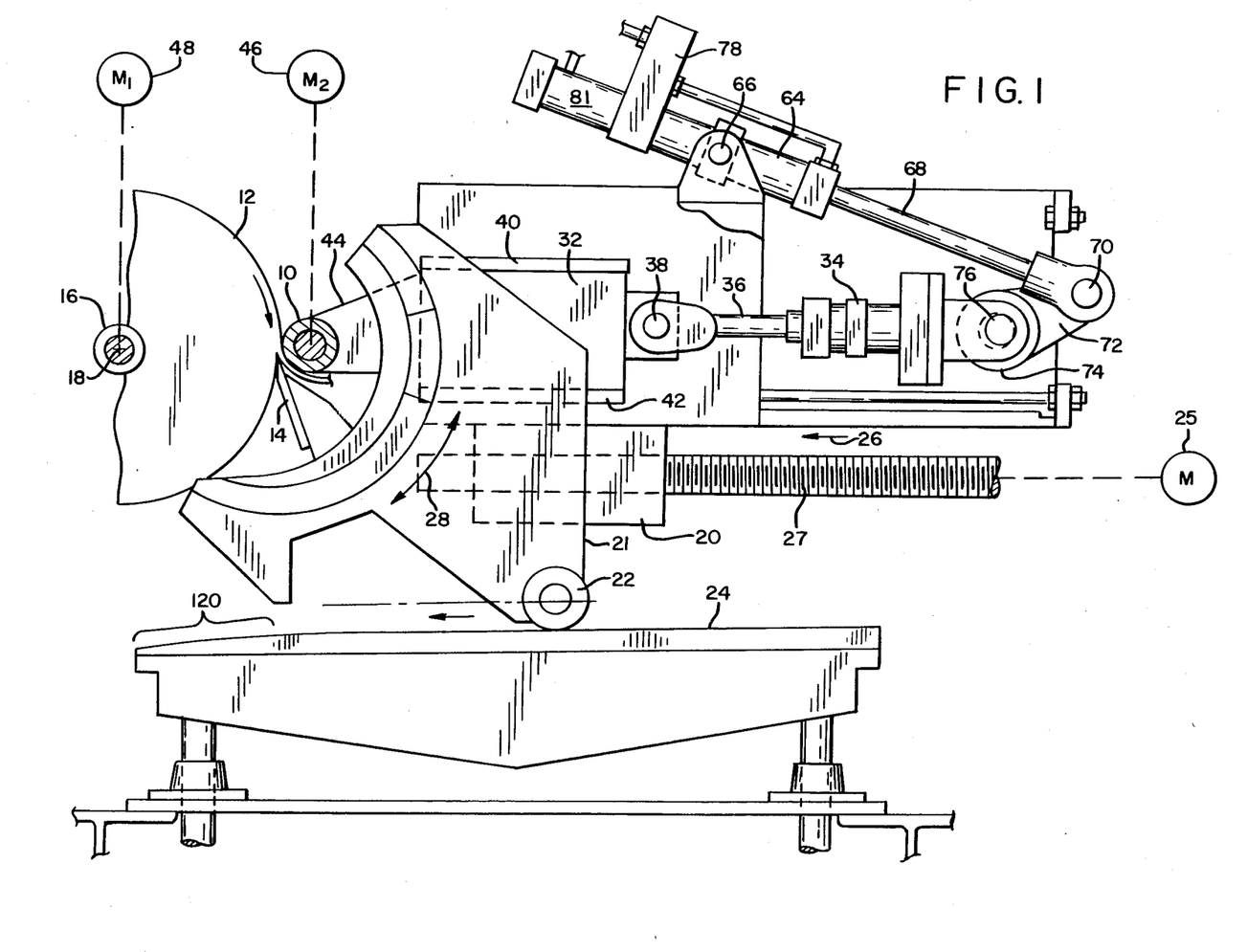
FIG. 1 is a partial section view of a veneer lathe apparatus in accordance with the present invention.

The nose bar roll 10 is mounted on a bar subcarriage 32 which is supported on the main carriage 20 for movement with the knife but is also movable relative to such main carriage by means of a first cylinder 34 whose piston rod 36 is pivotally attached at pivot 38 to the bar subcarriage 32 for reciprocating the nose bar roll between the contact position shown in FIG. 1 and a retracted position spaced from the log. In such retracted position of the nose bar roll, the log is rotated in contact with the knife 14 initially in order to round-up or true the log into a cylindrical shape before peeling begins. The bar subcarriage 32 slides horizontally between guide plates 40 and 42 to guide the horizontal movement of such carriage. The nose bar roll 10 is attached to the carriage 32 by a bar support 44.

The nose bar roll 10 is connected at its opposite ends to a pair of drive motors 46 for driving said nose bar roll to rotate it in a counterclockwise direction in FIG. 1 to provide auxiliary power for rotating the log 12 in a clockwise direction when such nose bar roll contacts the side of the log. The primary source of power for rotating the log 12 is provided by spindle motors 48 connected to the two drive spindles 16 which engage the opposite ends of the log in a conventional manner.

Figure 2:
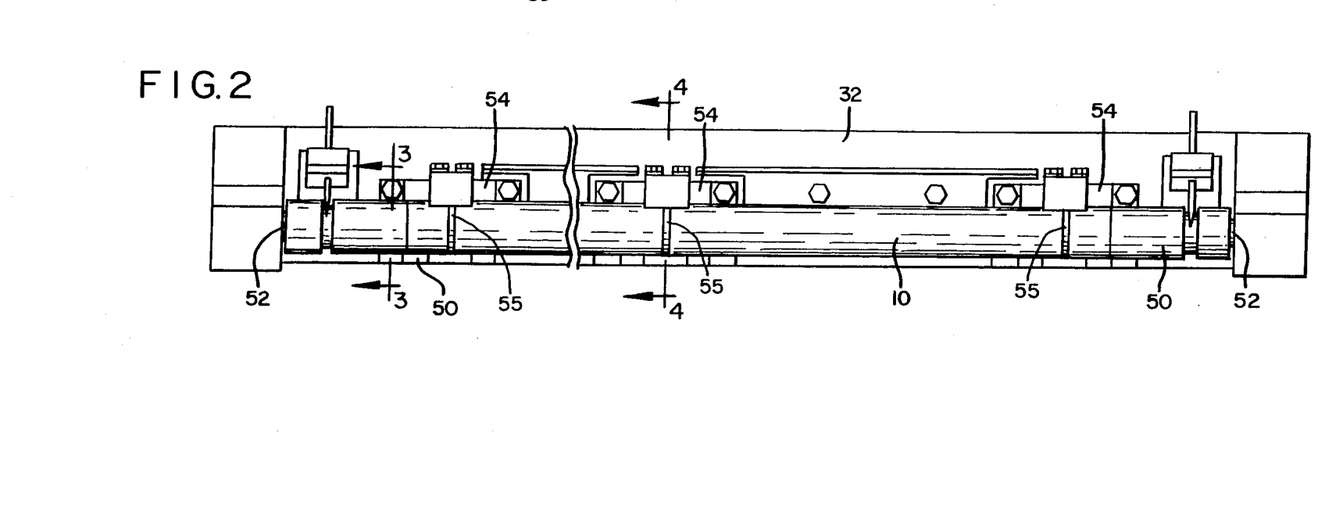
FIG. 2 is a front elevation view of the lathe apparatus of FIG. 1 showing the nose bar roll and associated mounting apparatus.
Figures 3, 4, 6:
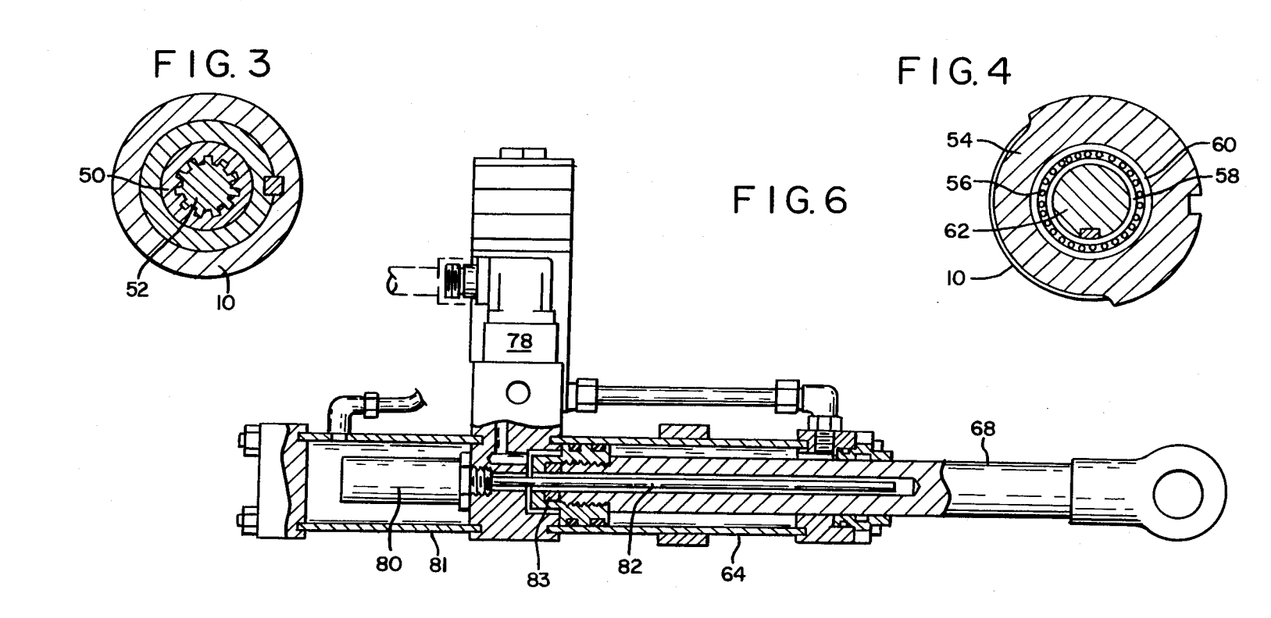
FIG. 3 is an enlarged vertical section view taken along the line 3—3 of FIG. 2 showing the splined coupling.
FIG. 4 is an enlarged vertical section view taken along the line 4—4 of FIG. 2 showing one of the needle bearings.
FIG. 6 is an enlarged view of the knife gap adjustment cylinder with parts broken away for clarity to show nose bar roll position sensor within such cylinders.

As shown in FIGS. 2 and 3, the nose bar roll 10 is connected by two splined couplings 50 at the opposite ends thereof to drive shafts 52 attached to sprockets which are coupled by chains to the drive motors 46. These splined couplings provide flexible coupling of the drive shafts 52 to the nose bar rolls and enable longitudinal movement of such nose bar roll relative to such drive shafts. The nose bar roll 10 is mounted on the bar support 44 by a plurality of bearings 54 provided at gaps 55 in the surface of the nose bar roll spaced along its length and fixed by keys to the bar support 44. As shown in FIG. 4, the bearings 54 may be needle bearings including a row of needle bearing rolls 56 contained within an inner race 58 and an outer race 60, with the inner race being keyed to a roll shaft 62 extending through and fixed to the nose bar roll.

An automatic knife gap adjustment means is provided in the lathe apparatus of the present invention and includes a second cylinder 64 which is mounted on a pivot 66 attached to the main carriage 20 as shown in FIG. 1. A piston rod 68 of cylinder 64 is attached by a pivot 70 at the outer end thereof to a lever arm 72. The lever arm 72 is attached to a shaft for rotating an eccentric 74 fixed to such shaft. The right end of the first piston 34 is attached to the eccentric at connecting pivot 76 spaced from the axis of rotation of the eccentric shaft. As a result, rotation of the eccentric 74 by the lever arm 72 in response to actuation of the second cylinder 64 causes the first cylinder 34 as well as the bar subcarriage 32 and the nose bar roll 10 to move relative to the main carriage 20 toward and away from the knife blade 14 in order to adjust the knife blade gap between the nose bar roller and such knife blade. The knife gap adjustment cylinder 64 is operated by a servo control valve 78 mounted on such cylinder. A transducer 80 is provided within a transducer housing 81 mounted on the left end of the cylinder 64 in order to sense the position of the piston rod 68 in such cylinder as it is adjusted to provide changes in the knife gap. As a result, such transducer produces an electrical signal which corresponds to the position of the nose bar roll relative to the knife blade to indicate the amount of knife blade gap. This electrical signal is fed to an electrical control system for automatically controlling the knife gap adjustment means, one such electrical control system being shown in FIG. 5.

The transducer 80 may be a linear distance measuring device made by Temposonics, Inc. of Plainview, New York and shown in FIG. 6 employing a sonic wave guide of the type described in U.S. Pat. 3,898,555 of J. Tellerman issued Aug. 5, 1975. Such transducer includes a sensor rod 82 which is a sonic pulse waveguide containing a magnetostrictive wire within a stainless steel tube that extends through a ring magnet 83 mounted on the piston of cylinder 62 so that the magnet moves with the piston along the sensor rod to produce the position signal.

Figure 5:
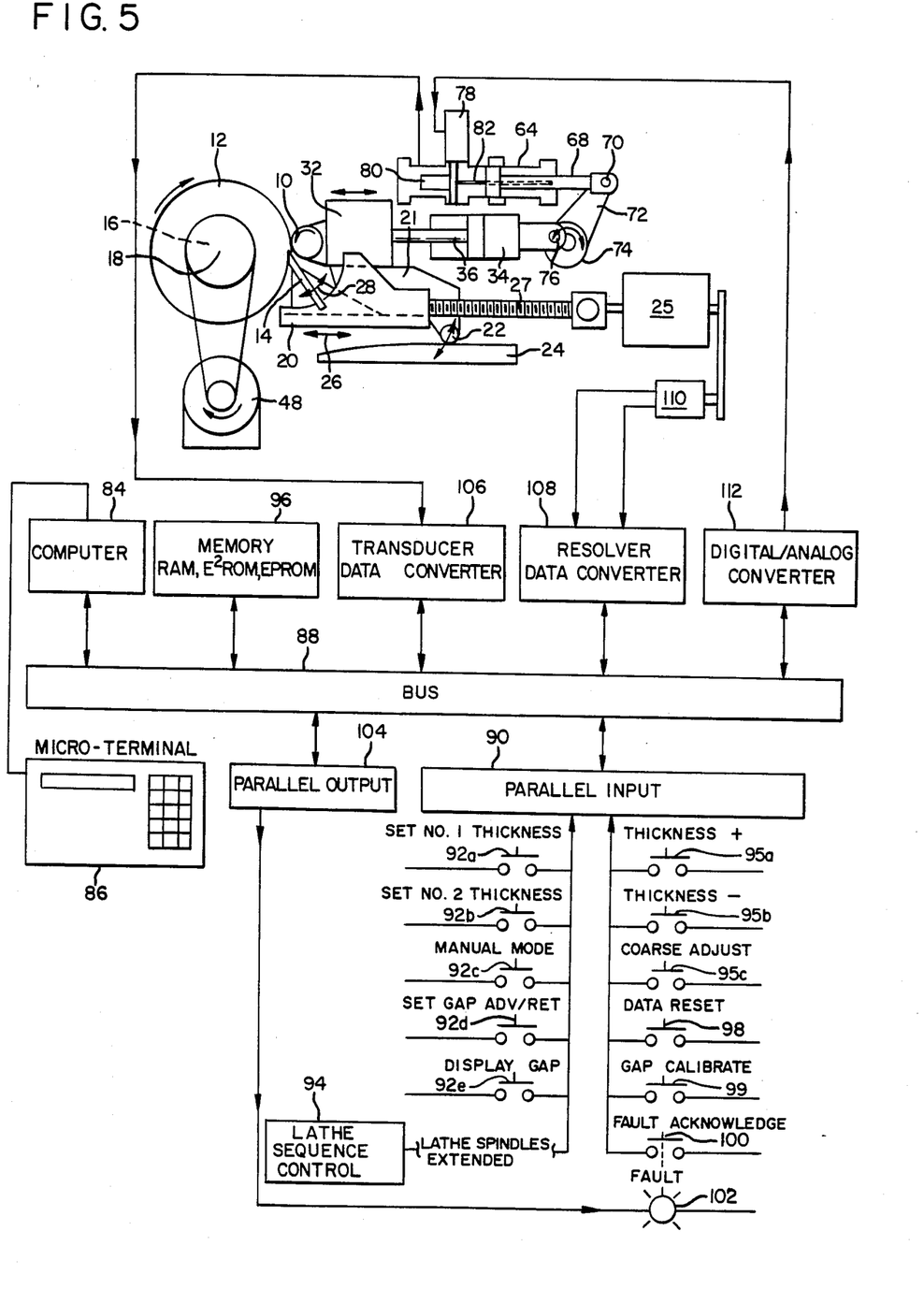
FIG. 5 is a partial section and block diagram of the apparatus of FIGS. 1 to 4 showing an electrical control system for automatic knife gap adjustment by movement of the nose bar roll relative to the lathe knife.

As shown in FIG. 5, one automatic electrical control system for controlling the knife gap adjustment means includes a digital computer central processing unit 84 (CPU) which is connected at one of its inputs to a computer terminal 86 for the manual input of data and for displaying output information generated by the computer, such as the knife gap or veneer thickness, on such terminal. The computer CPU 84 is connected at its outputs and other inputs to a data bus 88 containing a plurality of parallel data lines. The bus 88 is connected to a parallel input circuit 90 which supplies input data from a plurality of switches when they are closed. Two of such switches 92A and 92B are used to preset the thickness of the veneer at either a first thickness labeled "No. 1" such as 0.100 inch, or a second thickness labled "No. 2", such as 0.200 inch. A switch 92C is closed for operating the veneer lathe apparatus in the manual mode which disables the automatic operation and enables diagnostic testing of the system. A switch 92D is closed for operating the gap advance and retard which enables a "fine tuning" adjustment of the knife gap between the knife blade 14 and the nose bar roll 10 when the switches 95A and 95B are closed to compensate for knife dullness and other variables, such as wood conditions. In addition, there is a display gap switch 92E which, when closed, enables automatic operation of knife gap adjustment and displays the value of the knife gap on the terminal 86. There is a lathe sequence control input 94 which, among other things, signals whether No. 1 or No. 2 veneer thickness is to be peeled and when the lathe spindles 16 are extended into contact with the ends of the log for rotation of such log during peeling. Other inputs to the parallel input circuit 90 include a switch 95A which increases the thickness of veneer, a switch 95B which decreases the thickness of the veneer and a switch 95C which allows a coarse adjustment of the veneer thickness to any select value in order to preset the No. 1 and No. 2 veneer thicknesses of switches 92A and 92B. Also there is a data reset switch 98 which resets the data stored in the computer memory 96. Such computer memory may contain a random access memory (RAM), an electrical erasable read only memory ($E^2ROM$) and an electrical programmable read only memory (EPROM). The data stored in RAM and $E^2ROM$ memory is reset by data reset switch 98 to correct data error. This is also necessary for the RAM in the event there is loss of battery backup power for such RAM. There is also a gap calibrate switch 99 for calibrating the position of the transducer sensor 82 in the cylinder 64 for each knife gap. A fault acknowledgement switch 100 is closed when a fault in the system is detected by the computer and this is indicated by a fault light 102 actuated through a parallel output circuit 104. The fault acknowledgement switch 100 causes the computer to identify where the fault is in the system.

Figure 8A:
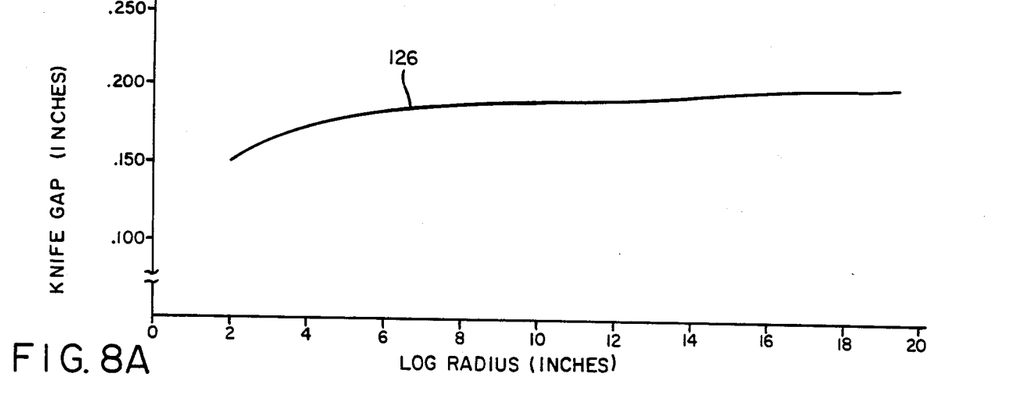
FIGS. 8A and 8B are graphs showing, respectively, the knife gap adjustment curve and the knife pitch angle adjustment curve as they vary with log radius for one type of log.
Figure 8B:
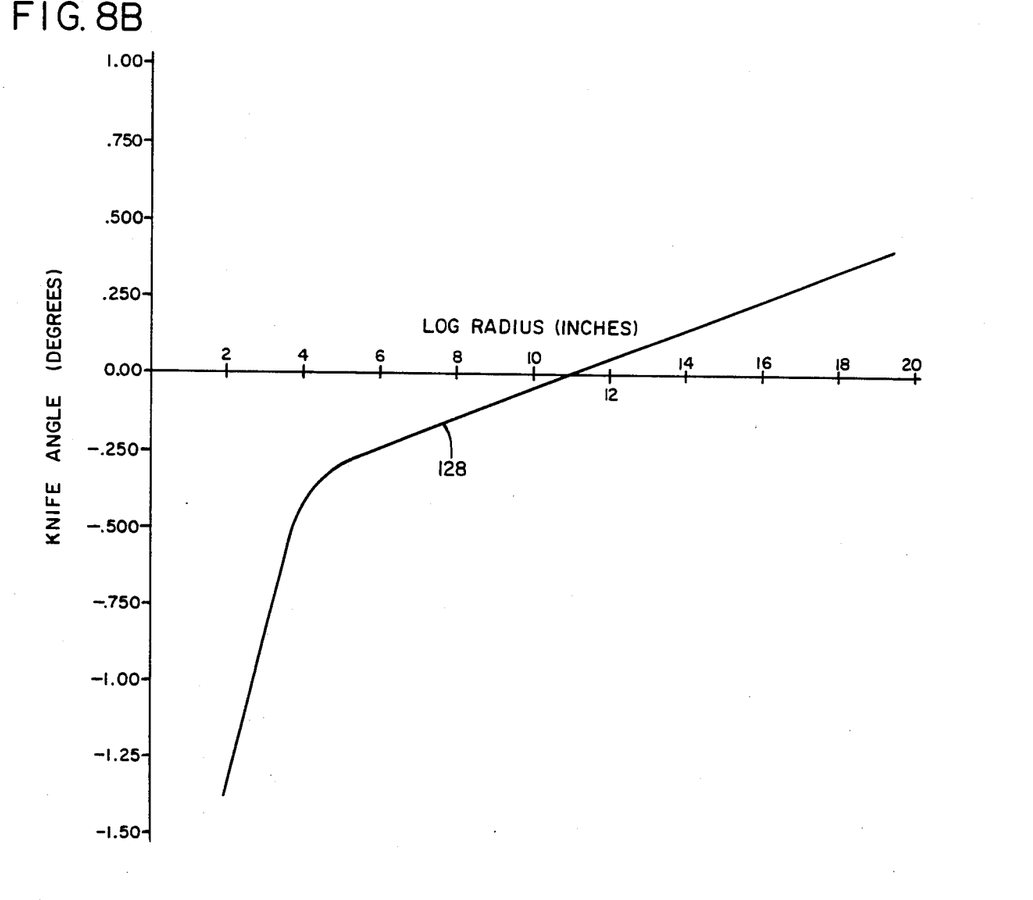

A transducer data converter circuit 106 is provided in the system of FIG. 5 with its input connected to the sensor 82 of transducer 80 and its output connected to the data bus 88 for supplying to the CPU a transducer data signal corresponding to the position of the nose bar roll 10 set by cylinder 64. A resolver data converter circuit 108 is provided having two inputs which are connected to fine and coarse resolver outputs of a resolver unit 110 that is coupled to the shaft of the main carriage drive motor 25. The resolver output signal corresponds to the horizontal position of the knife blade 14 and main carriage 20 which is related to the diameter of the log and to the knife pitch angle during peeling. Thus, the main carriage position also determines the position of the knife subcarriage 21 and the cam follower 22 on the knife pitchway 24. A table of values of knife pitch angle vs. cam follower-pitchway position is entered into the computer memory manually by the operator through terminal 86 for each knife pitchway cam surface and stored in memory 96. Thus, the CPU 84 receives a knife pitch angle signal from the memory which corresponds to the angle of the knife 14 produced by the cam track or knife pitch blade 24 at the position occupied by the cam follower roll 22 to pivot the knife carriage 21. Similarly, one or more tables of values of knife gap vs. log radius for a given veneer thickness and type of wood, is stored in the computer memory 96. From this stored information and the data that is received at converters 106 and 108, the CPU 84 determines to what reference value the knife gap should be adjusted, compares such reference value with the actuated gap and reduces such actual gap until it equals such reference value. A control signal at the output of a digital to analog converter 112 is applied to the servo valve 78 of cylinder 64 to reduce such knife gap until it equals such reference value in response to reductions in the diameter of the log and changes in the knife pitch angle during peeling. This knife gap adjustment control signal is produced by the CPU as a digital signal which is transmitted through the digital-to-analog converter 112 to convert it to an analog signal before it is applied to the servo valve. The control signal causes the valve 78 to change the position of the piston within the cylinder 64 and the position of such piston is then sensed by the transducer 80 and its associated sensor rod 82 to produce a nose bar roll position signal. Such nose bar roll position signal is applied to the computer through the transducer data converter 106 and bus 88 for comparison with the knife gap values stored in the memory 96. The knife blade gap is adjusted until it is equal to the gap for the particular diameter of the log 12 and knife blade pitch angle, such as shown in the graphs of FIGS. 8A to 8B.

As shown in FIG. 7A, during peeling the knife pitch angle $\theta$ is adjusted as the diameter of the log 12 decreases. The pitch angle is the angle between the front surface 114 of the knife and the vertical plane 30 passing through the tip 122 of the knife. For southern pine logs having a radius of about 20 inches, the pitch angle $\theta_0$ is about $+0.400$ degree. As the radius of the log decreases from 20 inches to about 5 inches, the angle $\theta$ gradually reduces linearly 0.700 degrees along a constant slope to an angle $\theta_1$ of about $-0.300$ degree. Then the angle changes more rapidly as the log radius decreases below 5 inches until at a radius of 2 inches the pitch angle $\theta_2$ is about $-1.300$ degrees, as shown by curve 128 in FIG. 8B. It should be noted that the pitch angle is zero degrees when the log radius is 11 inches for the curve shown in FIG. 8B.

The axis of rotation 18 of the log 12 is spaced a distance D in FIG. 7A from the axis of rotation 116 of the nose bar roll 10 so that $D = R_B + R_L + t$; where $R_B$ is the radius of the nose bar roll; $R_L$ is the radius of the log and t is the thickness of the wood veneer sheet 118. The pitch angle $\theta$ varies in response to changes in the diameter of the log in a manner determined by the slope of the cam or pitch rail 24 shown in FIG. 1. Thus, the pitch rail 24 slopes downward from its right end to its left end, such slope being constant for the majority of its length for logs of 20 to 5 inches radius, until reaching changing slope portion 120 for logs of 5 inches radius and less. Also note that the tip 122 of the knife blade 14 contacts the log 12 at a point spaced below the line joining the axes 18 and 116. The line joining the tip of the knife blade and the log axis 18 makes an angle $\theta_2$ with the line perpendicular to the front surface 114 of the knife when such knife is at the pitch angle $\theta_2$ for a 2 inch radius log.

Figure 7B:
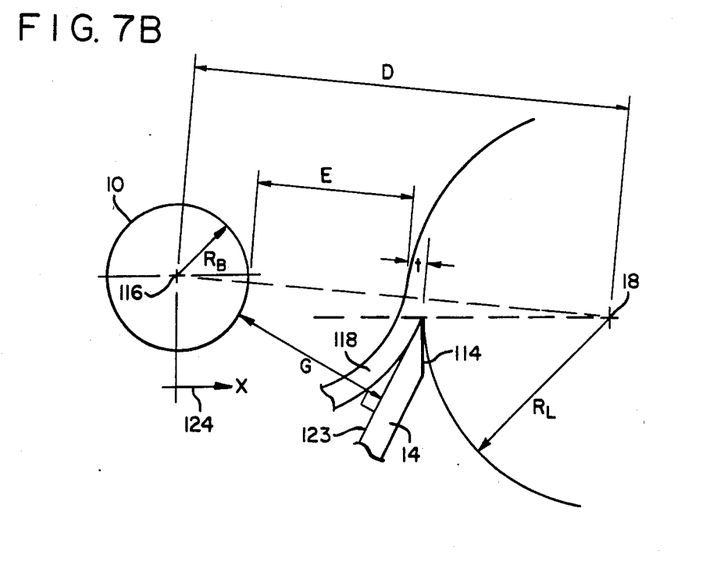

The knife gap G is the shortest distance between the nose bar roll 10 and the knife blade is measured from the nose bar roll to the rear surface 123 of knife blade 114 along a line perpendicular to such rear surface and passing through the axis 116 of such roll, as shown in FIGS. 7A and 7B. When the log 12 is peeled by the knife blade 14 to remove a veneer layer 118 of thickness t, the log radius $R_L$ decreases sufficiently to create an error space E between the nose bar roll 10 and the surface of the log as shown in FIG. 7B. This error space E must be reduced to zero so that the nose bar roll contacts the log and the knife gap distance G is maintained at the proper value to provide sufficient pressure on the log to produce veneer of the desired thickness t. This adjustment of the knife gap G is accomplished by moving the nose bar roll 10 horizontally to the right in the direction of arrow 124 toward the knife blade and along a line between axis 116 and axis of rotation 18 of the log. Once the error spacing E has been reduced to zero, then the distance D between the log axis 18 and the axis of rotation 116 of the nose bar roll 10 is again given by $D = R_B + R_L + t$.

Adjustment of the knife gap when peeling southern pine may be along curve 126 shown in FIG. 8A showing the knife gap G in inches on the vertical axis plotted against the log radius $R_L$ in inches along the horizontal axis. Thus, when peeling a veneer thickness of 0.100 inch, the knife gap reduces from a maximum of about 0.200 inch at a log radius of 20 inches to a minimum of about 0.150 inch at a log radius of 2 inches. In addition, the knife pitch angle $\theta$ varies with log radius along curve 128 from $+0.400$ degrees at a log radius of 20 inches to $-1.300$ degrees at a log radius of 2 inches as shown in FIG. 8B. Both of these knife gap and pitch angle adjustments are accomplished in the electrical control system of FIG. 5. Thus, the knife gap G is adjusted in accordance with curve 126 by the cylinder 64 through movement of piston rod 68, eccentric 74 and bar carriage 32 under the control of servo valve 78 and the position sensor transducer 80 by the computer system. However, the knife pitch angle $\theta$ is adjusted along curve 128 through movement of the main carriage 20 by lead screw 27 to cause the cam follower 22 to roll also knife pitch rail 24 and pivot knife carriage 21. The pitch angle is indicated by the output signal of resolver 110 corresponding to the horizontal position of the main carriage 20. This carriage position is coordinated by the CPU 84 with the knife angle table stored in the computer memory 96 to produce a signal corresponding to the proper pitch angle for the particular position of the knife carriage on pitch rail 24.

As a result, the knife gap G is controlled by the electrical control system of FIG. 5 to decrease such knife gap, such as in accordance with curve 126, in response to the reduction in the diameter of the log during peeling and in response to the change in knife pitch angle. Of course, it is possible to input different knife angle tables into the computer memory 96 for different types of wood, such as white fir rather than southern pine, in which case the pitch angle curve 128 and the knife gap curve 126 would change accordingly.

It will be obvious to one having ordinary skill in the art that many changes may be made in the above described preferred embodiment of the present invention. Therefore, the scope of the present invention should be determined by the following claims.

We claim:

1. A veneer lathe apparatus, comprising:
   drive means for rotating a log about a longitudinal axis of rotation;
   knife means for cutting a sheet of wood veneer from said log with a knife blade while the log is being rotated;
   feed means for advancing said knife blade toward the log as said log is peeled to reduce its diameter to a minimum diameter;
   knife angle adjustment means for adjusting the pitch angle of said knife blade during peeling;
   a nose bar roll means for applying pressure to the surface of the side of said log during peeling, said nose bar roll means contacting the log on at least a major portion of its length at a contact position ahead of said knife blade;
   gap adjustment means for reducing the knife gap between said nose bar roll means and said knife blade during peeling in response to decreases in the log diameter and changes in the knife pitch angle, and to maintain contact with the log at the proper pressure as the diameter of the log decreases; and
   electrical control means for automatically controlling said gap adjustment means in response to decreases in the log diameter and changes in the knife pitch angle.

2. A lathe apparatus in accordance with claim 1 in which the gap adjustment means includes an eccentric means which is rotated about its axis of rotation by an electrically actuated rotation means.

3. A lathe apparatus in accordance with claim 2 in which the rotation means includes fluid cylinder means.

4. A lathe apparatus in accordance with claim 3 in which the cylinder means is actuated by a valve means controlled by an electrical control signal produced by said electrical control means.

5. A lathe apparatus in accordance with claim 3 in which the cylinder means is provided with a sensor means for sensing the position of the piston of said cylinder means.

6. A lathe apparatus in accordance with claim 1 in which the control means includes fluid cylinder means operated by electrically actuated valve means.

7. A lathe apparatus in accordance with claim 6 in which the valve means is actuated by electrical data processor means in response to an output signal of detection means for detecting the position of the knife blade corresponding to the log diameter and to an output signal of a sensor means for sensing the position of said nose bar roll.

8. A lathe apparatus in accordance with claim 7 in which the sensor means senses the position of the piston in said cylinder means.

9. A lathe apparatus in accordance with claim 1 in which the nose bar roll means is driven by a power means and has a large diameter at least 15 times the thickness of the veneer and at least 1.5 inches in diameter.

10. A veneer lathe apparatus, comprising:
    drive means for rotating a log about a longitudinal axis of rotation;
    knife means for cutting a sheet of wood veneer from said log with a knife blade while the log is being rotated;
    feed means for advancing said knife blade toward the log as said log is peeled to reduce its diameter to a minimum diameter;
    a driven nose bar roll means for applying pressure to the surface of the side of said log, said nose bar roll means contacting the log on at least a major portion of its length at a contact position ahead of said knife blade, said nose bar roll means having a diameter of at least 15 times the thickness of the veneer and being driven by power means through couplings at the opposite ends thereof;
    gap adjustment means for advancing the nose bar roll means to reduce the knife gap between said nose bar roll means and said knife blade during peeling in response to decreases in the log diameter in order to maintain contact with said log at the proper pressure as the diameter of the log decreases; and
    electrical control means for automatically controlling said gap adjustment means in response to decreases in the log diameter.

11. A lathe apparatus in accordance with claim 10 in which the nose bar roll means is mounted on needle bearings.

12. A lathe apparatus in accordance with claim 10 in which the couplings at the opposite ends of the nose bar roll means are splined couplings.

13. A lathe apparatus in accordance with claim 11 in which the needle bearings are mounted at positions spaced along said nose bar roll means and are keyed to the shaft of such nose bar roll means to prevent rotation of a inner bearing race of each needle bearing.

14. A lathe apparatus in accordance with claim 13 in which needle bearings are mounted at gaps in the outer surface of the nose bar roll means and are keyed to its shaft at said gaps.

15. A lathe apparatus in accordance with claim 10 in which the control means includes an eccentric means which is rotated about its axis of rotation by an electrically actuated rotation means.

16. A lathe apparatus in accordance with claim 15 in which the rotation means includes fluid cylinder means.

17. A lathe apparatus in accordance with claim 16 in which the cylinder means is actuated by a valve means controlled by an electrical control signal produced by said electrical control means.

18. A lathe apparatus in accordance with claim 16 in which the cylinder means is provided with a sensor means for sensing the position of the piston of said cylinder means.

19. A lathe apparatus in accordance with claim 10 in which the control means includes fluid cylinder means operated by electrically actuated valve means.

20. A lathe apparatus in accordance with claim 19 in which the valve means is actuated by electrical computer means in response to an output signal of detection means for detecting the position of the knife blade corresponding to the log diameter and to an output signal of a sensor means for sensing the position of the nose bar roll means.

* * * * *